(12) United States Patent
Kaneko et al.

(10) Patent No.: US 8,460,571 B2
(45) Date of Patent: Jun. 11, 2013

(54) LUBRICANT COMPOSITION FOR REFRIGERATOR AND COMPRESSOR USING THE SAME

(75) Inventors: Masato Kaneko, Chiba (JP); Harutomo Ikeda, Chiba (JP); Takayuki Kato, Aichi (JP); Takahiro Hoshida, Aichi (JP); Masaki Inoue, Aichi (JP); Shozo Ikejima, Aichi (JP); Masataka Muto, Aichi (JP); Masahito Yamashita, Aichi (JP)

(73) Assignees: Idemitsu Kosan Co., Ltd., Tokyo (JP); Kabushiki Kaisha Toyota Jidoshokki, Kariya-shi (JP); Denso Corporation, Kariya-shi (JP)

( * ) Notice: Subject to any disclaimer, the term of this patent is extended or adjusted under 35 U.S.C. 154(b) by 524 days.

(21) Appl. No.: 12/663,941

(22) PCT Filed: Jun. 12, 2008

(86) PCT No.: PCT/JP2008/060792
§ 371 (c)(1),
(2), (4) Date: Apr. 1, 2010

(87) PCT Pub. No.: WO2008/153106
PCT Pub. Date: Dec. 18, 2008

(65) Prior Publication Data
US 2010/0175421 A1 Jul. 15, 2010

(30) Foreign Application Priority Data

Jun. 12, 2007 (JP) .................... 2007-155121

(51) Int. Cl.
*C09K 5/04* (2006.01)
(52) U.S. Cl.
USPC ........................................... 252/68
(58) Field of Classification Search
USPC ........................................... 252/68
See application file for complete search history.

(56) References Cited

U.S. PATENT DOCUMENTS

| 5,648,016 | A | | 7/1997 | Klug et al. | |
|---|---|---|---|---|---|
| 6,008,169 | A | * | 12/1999 | Kaneko | 508/501 |
| 6,306,803 | B1 | * | 10/2001 | Tazaki | 508/539 |
| 6,454,960 | B1 | | 9/2002 | Sunaga et al. | |
| 6,815,402 | B2 | * | 11/2004 | Tazaki et al. | 508/422 |
| 7,018,961 | B2 | * | 3/2006 | Tazaki | 508/579 |
| 7,959,824 | B2 | * | 6/2011 | Tagawa et al. | 252/68 |
| 2004/0089839 | A1 | | 5/2004 | Thomas et al. | |
| 2004/0119047 | A1 | * | 6/2004 | Singh et al. | 252/71 |
| 2004/0127383 | A1 | | 7/2004 | Pham et al. | |
| 2004/0180796 | A1 | * | 9/2004 | Iwata et al. | 508/103 |
| 2005/0233923 | A1 | * | 10/2005 | Singh et al. | 510/177 |
| 2007/0032391 | A1 | * | 2/2007 | Tagawa et al. | 508/421 |
| 2007/0155635 | A1 | * | 7/2007 | Tagawa et al. | 508/463 |
| 2007/0272893 | A1 | * | 11/2007 | Kaneko | 252/68 |
| 2010/0108936 | A1 | * | 5/2010 | Kaneko | 252/68 |
| 2010/0133463 | A1 | * | 6/2010 | Kaneko et al. | 252/68 |
| 2010/0139311 | A1 | * | 6/2010 | Nagao et al. | 62/468 |
| 2011/0023531 | A1 | * | 2/2011 | Kaneko et al. | 62/468 |

FOREIGN PATENT DOCUMENTS

| JP | 2 134461 | 11/1990 |
|---|---|---|
| JP | 5 32985 | 2/1993 |
| JP | 9 78077 | 3/1997 |
| JP | 10 36865 | 2/1998 |
| JP | 11 293273 | 10/1999 |
| JP | 2001 98290 | 4/2001 |
| JP | 2001 280728 | 10/2001 |
| JP | 2001 311088 | 11/2001 |
| JP | 2004 43611 | 2/2004 |
| JP | 2007 510039 | 4/2007 |
| WO | 98 36040 | 8/1998 |
| WO | 2005 103190 | 11/2005 |
| WO | 2008 053951 | 5/2008 |
| WO | 2008 056629 | 5/2008 |

OTHER PUBLICATIONS

U.S. Appl. No. 12/867,183, filed Aug. 11, 2010, Kaneko, et al.
U.S. Appl. No. 12/867,679, filed Aug. 13, 2010, Kaneko, et al.
U.S. Appl. No. 12/513,235, filed May 1, 2009, Kaneko.

* cited by examiner

*Primary Examiner* — Douglas McGinty
(74) *Attorney, Agent, or Firm* — Oblon, Spivak, McClelland, Maier & Neustadt, L.L.P.

(57) ABSTRACT

Provided is a lubricant composition for a refrigerator, which is characterized by using a substance mainly containing a polyoxyalkylene glycol derivative and having a hydroxyl number of 5 mgKOH/g or less, as a base oil. Also provided is a compressor using such the lubricant composition for a refrigerator. The lubricant composition for a refrigerator is used for a refrigerator which uses a refrigerant having a specific structure such as an unsaturated fluorohydrocarbon and being usable in current air-conditioning systems for cars or the like. The lubricant composition for a refrigerator exhibits excellent compatibility with the refrigerant, while having excellent stability. The compressor uses such the lubricant composition for a refrigerator.

23 Claims, No Drawings

LUBRICANT COMPOSITION FOR REFRIGERATOR AND COMPRESSOR USING THE SAME

TECHNICAL FIELD

The present invention relates to a lubricant composition for a refrigerator and a compressor using the same, and more specifically, to a lubricant composition for a refrigerator, which is used for a refrigerator using a specific refrigerant such as an unsaturated fluorohydrocarbon compound serving as a refrigerant having a low global warming potential and being available particularly in current air-conditioning systems for cars or the like, and which uses a base oil mainly containing a specific polyoxyalkylene glycol derivative, and a compressor using the same.

BACKGROUND ART

In general, a compression refrigerator includes at least a compressor, a condenser, an expansion mechanism (such as an expansion valve), and an evaporator, or further includes a drier, and is structured so that a mixed liquid of a refrigerant and lubricant (refrigerator oil) circulates in a closed system. In such a compression refrigerator, the temperature in the compressor is generally high, and the temperature in the condenser is generally low, though such general theory depends on the kind of such a compression refrigerator. Accordingly, the refrigerant and the lubricant must circulate in the system without undergoing phase separation in a wide temperature range from low temperature to high temperature. In general, the refrigerant and the lubricant have regions where they undergo phase separation at low temperatures and high temperatures. Moreover, the highest temperature of the region where the refrigerant and the lubricant undergo phase separation at low temperatures is preferably −10° C. or lower, or particularly preferably −20° C. or lower. On the other hand, the lowest temperature of the region where the refrigerant and the lubricant undergo phase separation at high temperatures is preferably 10° C. or higher, more preferably 30° C. or higher, or particularly preferably 40° C. or higher. The occurrence of the phase separation during the operation of the refrigerator adversely affects the lifetime and efficiency of the refrigerator to a remarkable extent. For example, when the phase separation of the refrigerant and the lubricant occurs in the compressor portion, a movable part is insufficiently lubricated, with the result that baking or the like occurs to shorten the lifetime of the refrigerator remarkably. On the other hand, when the phase separation occurs in the evaporator, the lubricant having a high viscosity is present, with the result that the efficiency of heat exchange reduces.

A chlorofluorocarbon (CFC), a hydrochlorofluorocarbon (HCFC), or the like has been heretofore mainly used as a refrigerant for a refrigerator. However, such compounds each contain chlorine that is responsible for environmental issues, so investigation has been conducted on a chlorine-free alternative refrigerant such as a hydrofluorocarbon (HFC). A hydrofluorocarbon typified by, for example, 1,1,1,2-tetrafluoroethane, difluoromethane, pentafluoroethane, or 1,1,1-trifluoroethane has been attracting attention, and, for example, 1,1,1,2-tetrafluoroethane has been used in an air-conditioning system for cars However, because the influence of the HFC is also concerned from the viewpoint of the global warming, so-called natural refrigerants such as carbon dioxide have attracted attention as alternative refrigerants more suitable for environmental protection. The carbon dioxide requires high pressure, and hence cannot be used in the current air-conditioning system for cars.

A refrigerant having a specific polar structure in the molecule such as an unsaturated fluorinated hydrocarbon compound (see, for example, Patent Document 1), a fluorinated ether compound (see, for example, Patent Document 2), a fluorinated alcohol compound, or a fluorinated ketone compound has been found as a refrigerant which has a low global warming potential and can be used in a current air-conditioning system for cars.

The lubricant for a refrigerator that uses the refrigerant is demanded to have excellent compatibility with the refrigerant and excellent stability.

Patent Document 1: JP 2006-503961 A
Patent Document 2: JP 07-507342 A

DISCLOSURE OF THE INVENTION

Problems to be Solved by the Invention

Under the circumstances, an object of the present invention is to provide a lubricant composition for a refrigerator having the following characteristics and a compressor using the lubricant composition for a refrigerator: the composition being used for a refrigerator using a refrigerant having a specific structure such as an unsaturated fluorinated hydrocarbon compound serving as a refrigerant having a low global warming potential and usable particularly in current air-conditioning system for cars; and the composition having excellent stability as well as excellent compatibility with the refrigerant.

Means for Solving the Problems

The inventors of the present invention have studied extensively to achieve the object. As a result, the inventors have found that the object can be achieved by using a base oil containing a specific polyalkylene glycol derivative and having specific properties, and preferably using a specific material for a friction part in a refrigerator. The present invention has been completed based on findings thereof.

That is, the present invention provides:
(1) a lubricant composition for a refrigerator, comprising a base oil containing a polyoxyalkylene glycol derivative as a main component and having a hydroxyl number of 5 mgKOH/g or less, the refrigerator using a refrigerant containing at least one kind of fluorine-containing organic compound selected from compounds represented by the following molecular formula (A) or including a combination of the fluorine-containing organic compound and a saturated fluorinated hydrocarbon compound, $$C_p O_q F_r R_s \quad (A)$$

wherein R represents Cl, Br, I, or H; "p" represents an integer of 1 to 6, "q" represents an integer of 0 to 2, "r" represents an integer of 1 to 14, and "s" represents an integer of 0 to 13; and provided that, when "q" represents 0, "p" represents 2 to 6 and one or more carbon-carbon unsaturated bonds are included in molecules;
(2) the lubricant composition for a refrigerator according to the item (1), wherein the refrigerant is formed of an unsaturated fluorinated hydrocarbon refrigerant having 2 to 3 carbon atoms or a combination of a saturated fluorinated hydrocarbon refrigerant having 1 to 2 carbon atoms and an unsaturated fluorinated hydrocarbon refrigerant having 3 carbon atoms;

(3) the lubricant composition for a refrigerator according to the item (1) or (2), wherein the base oil has a kinematic viscosity of 2 to 50 mm²/s at 100° C.;
(4) the lubricant composition for a refrigerator according to any one of the items (1) to (3), wherein the base oil has a molecular weight of 500 or more;
(5) the lubricant composition for a refrigerator according to any one of the items (1) to (4), wherein the polyoxyalkylene glycol derivative is a compound represented by the general formula (I):

$$R^1—[(OR^2)_m—OR^3]_n \qquad (I)$$

wherein $R^1$ represents a hydrogen atom, a hydrocarbon group having 1 to 10 carbon atoms, an acyl group having 2 to 10 carbon atoms, a hydrocarbon group having 2 to 6 binding sites and 1 to 10 carbon atoms, or an oxygen-containing hydrocarbon group having 1 to 10 carbon atoms; $R^2$ represents an alkylene group having 2 to 4 carbon atoms; $R^3$ represents a hydrogen atom, a hydrocarbon group having 1 to 10 carbon atoms, an acyl group having 2 to 10 carbon atoms, or an oxygen-containing hydrocarbon group having 1 to 10 carbon atoms; "n" represents an integer of 1 to 6; and "m" represents a number with which an average value of "m×n" becomes 6 to 80;
(6) the lubricant composition for a refrigerator according to any one of the items (1) to (5), including at least one kind of additive selected from an extreme pressure agent, an oiliness agent, an antioxidant, an acid scavenger, and an anti-foaming agent;
(7) the lubricant composition for a refrigerator according to any one of the items (1) to (6), wherein a friction part in the refrigerator is formed of an engineering plastic or includes an organic coating film or an inorganic coating film;
(8) the lubricant composition for a refrigerator according to the item (7), wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent;
(9) the lubricant composition for a refrigerator according to the item (7), wherein the inorganic coating film is a graphite film, a diamond-like carbon film, a tin film, a chromium film, a nickel film, or a molybdenum film;
(10) the lubricant composition for a refrigerator according to any one of the items (1) to (9), which is used in various hot-water supplying systems or refrigeration and heating systems for car air conditioners, electric air conditioners for cars, gas heat pumps, air conditioners, refrigerators, vending machines, or showcases;
(11) the lubricant composition for a refrigerator according to the item (10), wherein a water content in a system is 300 ppm by mass or less and a residual air partial pressure in the system is 10 kPa or less;
(12) a compressor using the lubricant composition for a refrigerator according to any one of the items (1) to (6);
(13) the compressor according to the item (12), wherein a friction part is formed of an engineering plastic or includes an organic coating film or an inorganic coating film;
(14) the compressor according to the item (13), wherein the engineering plastic is a polyamide resin, a polyphenylene sulfide resin, or a polyacetal resin;
(15) the compressor according to the item (13), wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent; and
(16) the compressor according to the item (13), wherein the inorganic coating film is a graphite film, a diamond-like carbon film, a tin film, a chromium film, a nickel film, or a molybdenum film.

Effects by the Invention

According to the present invention, there can be provided a lubricant composition for a refrigerator having the following characteristics and a compressor using the lubricant composition for a refrigerator: the composition being used for a refrigerator using a refrigerant having a specific structure such as an unsaturated fluorinated hydrocarbon compound serving as a refrigerant having a low global warming potential and usable particularly in current air-conditioning systems for cars; and the composition having excellent stability as well as excellent compatibility with the refrigerant.

BEST MODE FOR CARRYING OUT THE INVENTION

The lubricant composition for a refrigerator of the present invention is a lubricant composition for a refrigerator using a refrigerant including at least one kind of fluorine-containing organic compounds selected from compounds represented by the following molecular formula (A) or including a combination of the fluorine-containing organic compound and a saturated fluorinated hydrocarbon compound, $$C_pO_qF_rR_s \qquad (A)$$

where: R represents Cl, Br, I, or H; "p" represents an integer of 1 to 6, "q" represents an integer of 0 to 2, "r" represents an integer of 1 to 14, and "s" represents an integer of 0 to 13; and provided that, when "q" represents 0, "p" represents 2 to 6 and one or more carbon-carbon unsaturated bonds are included in the molecule.

<Refrigerant>

The molecular formula (A) represents the kind and the number of the elements in the molecule. The formula (A) represents the fluorine-containing organic compound in which "p" as the number of the carbon atoms C represents 1 to 6. As long as the fluorine-containing organic compound is a fluorine-containing organic compound having 1 to 6 carbon atoms, the fluorine-containing organic compound can have physical and chemical properties required for the refrigerant, such as a boiling point, a coagulation point, and an evaporative latent heat.

In the molecular formula (A), a binding form of "p" carbon atoms represented by $C_p$ includes a carbon-carbon single bond, an unsaturated bond such as a carbon-carbon double bond, and a carbon-oxygen double bond. The carbon-carbon unsaturated bond is preferably a carbon-carbon double bond from the viewpoint of stability. The number of the carbon-carbon double bond is 1 or more, and it is preferably 1.

In addition, in the molecular formula (A), a binding form of "q" oxygen atoms represented by $O_q$ is preferably oxygen atoms derived from ether groups, hydroxyl groups, or carbonyl groups. The number of the oxygen atoms "q" may be 2, and the case where the compound has two ether groups, hydroxyl groups, or the like is also included.

In addition, in the case where "q" represents 0 in $O_q$ and no oxygen atom is included in the molecule, "p" represents 2 to 6, and the molecule has one or more unsaturated bonds such as a carbon-carbon double bond. That is, at least one of the binding forms of "p" carbon atoms represented by $C_p$ needs to be a carbon-carbon unsaturated bond.

In addition, in the molecular formula (A), R represents Cl, Br, I, or H, and may represent any one of them. R preferably represents H because of its less possibility of destroying the ozone layer.

As described above, as the fluorine-containing organic compound represented by the molecular formula (A), an unsaturated fluorinated hydrocarbon compound, a fluorinated ether compound, a fluorinated alcohol compound, a fluorinated ketone compound, and the like are suitably exemplified.

Hereinafter, those compounds are described.

[Unsaturated Fluorinated Hydrocarbon Compound]

In the present invention, as the unsaturated fluorinated hydrocarbon compound used as a refrigerant for a refrigerator, there are exemplified unsaturated fluorinated hydrocarbon compounds where, in the molecular formula (A), R represents H, "p" represents 2 to 6, "q" represents 0, "r" represents 1 to 12, and "s" represents 0 to 11.

Examples of the unsaturated fluorinated hydrocarbon compounds preferably include a fluorinated compound of a straight-chain or branched-chain olefin having 2 to 6 carbon atoms and a fluorinated compound of a cyclic olefin having 4 to 6 carbon atoms.

Specific examples thereof include ethylenes having 1 to 3 fluorine atoms introduced, propenes having 1 to 5 fluorine atoms introduced, butenes having 1 to 7 fluorine atoms introduced, pentenes having 1 to 9 fluorine atoms introduced, hexenes having 1 to 11 fluorine atoms introduced, cyclobutenes having 1 to 5 fluorine atoms introduced, cyclopentenes having 1 to 7 fluorine atoms introduced, and cyclohexenes having 1 to 9 fluorine atoms introduced.

Of those unsaturated fluorinated hydrocarbon compounds, unsaturated fluorinated hydrocarbon compounds having 2 to 3 carbon atoms are preferred, and a fluorinated compound of propene is more preferred. Examples of the fluorinated compound of propene include various kinds of isomers of pentafluoropropene, 3,3,3-trifluoropropene, and 2,3,3,3-tetrafluoropropene, and 1,2,3,3,3-pentafluoropropene and 2,3,3,3-tetrafluoropropene are particularly suitable.

In the present invention, one kind of unsaturated fluorinated hydrocarbon compound may be used alone or two or more kinds thereof may be used in combination.

In addition, a combination of a saturated fluorinated hydrocarbon refrigerant having 1 to 2 carbon atoms and an unsaturated fluorinated hydrocarbon refrigerant having 3 carbon atoms is also suitably used. Examples of the combination include a combination of the above-mentioned 1,2,3,3,3-pentafluoropropene and $CH_2F_2$, a combination of the above-mentioned 1,2,3,3,3-pentafluoropropene and $CHF_2CH_3$, and a combination of the above-mentioned 2,3,3,3-tetra fluoropropene and $CF_3I$.

[Fluorinated Ether Compound]

In the present invention, as the fluorinated ether compound used as a refrigerant for a refrigerator, there are exemplified fluorinated ether compounds where, in the molecular formula (A), R represents H, "p" represents 2 to 6, "q" represents 1 to 2, "r" represents 1 to 14, and "s" represents 0 to 13.

Examples of the fluorinated ether compound preferably include: a fluorinated compound of a chain aliphatic ether having 2 to 6 carbon atoms, 1 or 2 ether bonds, and a straight-chain or branched alkyl group; and a fluorinated compound of a cyclic aliphatic ether having 3 to 6 carbon atoms and 1 to 2 ether bonds.

Examples thereof specifically include dimethyl ethers having 1 to 6 fluorine atoms introduced, methyl ethyl ethers having 1 to 8 fluorine atoms introduced, dimethoxymethanes having 1 to 8 fluorine atoms introduced, methylpropyl ethers having 1 to 10 fluorine atoms introduced, methylbutyl ethers having 1 to 12 fluorine atoms introduced, ethylpropyl ethers having 1 to 12 fluorine atoms introduced, oxetanes having 1 to 6 fluorine atoms introduced, 1,3-dioxoranes having 1 to 6 fluorine atoms introduced, and tetrahydrofurans having 1 to 8 fluorine atoms introduced.

Examples of those fluorinated ether compounds include hexafluorodimethyl ether, pentafluorodimethyl ether, bis(difluoromethyl)ether, fluoromethyl trifluoromethyl ether, trifluoromethyl methyl ether, perfluorodimethoxy methane, 1-trifluoromethoxy-1,1,2,2-tetrafluoroethane, difluoromethoxy pentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, one kind of fluorinated ether compound may be used alone or two or more kinds thereof may be used in combination.

[Fluorinated Alcohol Compound]

In the present invention, as the fluorinated alcohol compound used as a refrigerant for a refrigerator and represented by the general formula (A), there are exemplified fluorinated ether compounds where, in the molecular formula (A), R represents H, "p" represents 1 to 6, "q" represents 1 to 2, "r" represents 1 to 13, and "s" represents 1 to 13.

Examples of the fluorinated alcohol compound preferably include a fluorinated compound of a straight-chain or branched aliphatic alcohol having 1 to 6 carbon atoms and 1 or 2 hydroxyl groups.

Examples thereof specifically include methyl alcohols having 1 to 3 fluorine atoms introduced, ethyl alcohols having 1 to 5 fluorine atoms introduced, propyl alcohols having 1 to 7 fluorine atoms introduced, butyl alcohols having 1 to 9 fluorine atoms introduced, pentyl alcohols having 1 to 11 fluorine atoms introduced, ethylene glycols having 1 to 4 fluorine atoms introduced, and propylene glycols having 1 to 6 fluorine atoms introduced.

Examples of those fluorinated alcohol compounds include monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol, tetrafluoroethylene glycol, and further, various isomers of difluoropropylene glycol, various isomers of trifluoropropylene glycol, various isomers of tetrafluoropropylene glycol, various isomers of pentafluoropropylene glycol, a fluorinated propylene glycol such as hexafluoropropylene glycol, and a fluorinated trimethylene glycol corresponding to the fluorinated propylene glycol.

In the present invention, one kind of fluorinated alcohol compound may be used alone or two or more kinds thereof may be used in combination.

[Fluorinated Ketone Compound]

In the present invention, as the fluorinated ketone compound used as a refrigerant for a refrigerator, there are exemplified fluorinated ketone compounds in which, in the molecular formula (A), R represents H, "p" represents 2 to 6, "q" represents 1 to 2, "r" represents 1 to 12, and "s" represents 0 to 11.

Examples of the fluorinated ketone compounds preferably include fluorinated compounds of aliphatic ketones each having 3 to 6 carbon atoms and a straight-chain or branched alkyl group.

Examples thereof specifically include acetones having 1 to 6 fluorine atoms introduced, methyl ethyl ketones having 1 to 8 fluorine atoms introduced, diethyl ketones having 1 to 10 fluorine atoms introduced, and methyl propyl ketones having 1 to 10 fluorine atoms introduced.

Examples of those fluorinated ketone compounds include hexafluorodimethyl ketone, pentafluorodimethyl ketone, bis(difluoromethyl)ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the present invention, one kind of fluorinated ketone compound may be used alone or two or more kinds thereof may be used in combination.

[Saturated Fluorinated Hydrocarbon Compound]

The saturated fluorinated hydrocarbon compound is a refrigerant that can be mixed, as required, in at least one kind of fluorine-containing organic compound selected from the compounds represented by the above general formula (A).

As the saturated fluorinated hydrocarbon compound, a fluorinated compound of alkane having 1 to 4 carbon atoms is preferred and fluorinated compounds of methane or ethane having 1 to 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane, and 1,1,1,2,2-pentafluoroethane are particularly suitable. In addition, as the saturated fluorinated hydrocarbon compound, the fluorinated alkane may be further halogenated with a halogen atom other than fluorine, and trifluoroiodomethane ($CF_3I$) and the like are exemplified. One kind of saturated fluorinated hydrocarbon compound may be used alone or two or more kinds thereof may be used in combination.

In addition, the blending amount of the saturated fluorinated hydrocarbon compound is typically 30% by mass or less, preferably 20% by mass or less, and more preferably 10% by mass or less based on the total amount of the refrigerant.

The lubricant composition for a refrigerator of the present invention (hereinafter may be referred to as refrigerator oil composition) is a lubricant composition for a refrigerator which uses the above-mentioned refrigerant, and the refrigerator oil composition includes any one of the following compounds as a base oil.

[Base Oil]

As the base oil of the refrigerator oil composition of the present invention, there is used a polyoxyalkylene glycol derivative.

Examples of the polyoxyalkylene glycol derivative preferably include a compound represented by the general formula (I):

$$R^1-[(OR^2)_m-OR^3]_n \qquad (I)$$

where: $R^1$ represents a hydrogen atom, a hydrocarbon group having 1 to 10 carbon atoms, an acyl group having 2 to 10 carbon atoms, a hydrocarbon group having 2 to 6 binding sites and 1 to 10 carbon atoms, or an oxygen-containing hydrocarbon group having 1 to 10 carbon atoms; $R^2$ represents an alkylene group having 2 to 4 carbon atoms; $R^3$ represents a hydrogen atom, a hydrocarbon group having 1 to 10 carbon atoms, an acyl group having 2 to 10 carbon atoms, or an oxygen-containing hydrocarbon group having 1 to 10 carbon atoms; "n" represents an integer of 1 to 6; and "m" represents a number with which an average value of "m×n" becomes 6 to 80.

In the general formula (I), the hydrocarbon group having 1 to 10 carbon atoms represented by each of $R^1$ and $R^3$ may be a straight-chain one, or branched-chain one, or cyclic one. The hydrocarbon group is preferably an alkyl group, and specific examples thereof include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the carbon number of the alkyl group exceeds 10, the compatibility with the refrigerant decreases and a phase separation may occur in some cases. The carbon number of the alkyl group is preferably 1 to 6.

Further, a hydrocarbon group moiety of the acyl group having 2 to 10 carbon atoms represented by each of $R^1$ and $R^3$ may be a straight-chain one, branched-chain one, or cyclic one. The hydrocarbon group moiety of the acyl group is preferably an alkyl group, and specific examples thereof include the various groups having 1 to 9 carbon atoms which are exemplified as the specific examples of the above-mentioned alkyl group. When the carbon number of the acyl group exceeds 10, the compatibility with the refrigerant decreases and a phase separation may occur in some cases. The carbon number of the acyl group is preferably 2 to 6.

In the case where both $R^1$ and $R^3$ each represent a hydrocarbon group or both $R^1$ and $R^3$ each represent an acyl group, $R^1$ and $R^3$ may be identical to or different from each other.

In addition, in the case where "n" represents 2 or more, a plurality of $R^3$'s in one molecule may be identical to or different from each other.

In the case where $R^1$ represents a hydrocarbon group having 2 to 6 binding sites and 1 to 10 carbon atoms, the hydrocarbon group may be chained or cyclic. As a hydrocarbon group having 2 binding sites, an aliphatic hydrocarbon group is preferred, and examples thereof include an ethylene group, a propylene group, a butylene group, a pentylene group, a hexylene group, a heptylene group, an octylene group, a nonylene group, a decylene group, a cyclopentylene group, and cyclohexylene group. As other hydrocarbon groups, there can be exemplified residues each obtained by removing a hydroxyl group from bisphenols such as biphenol, bisphenol F, or bisphenol A. Further, as a hydrocarbon group having 3 to 6 binding sites, an aliphatic hydrocarbon group is preferred, and there can be exemplified residues each obtained by removing a hydroxyl group from a polyvalent alcohol such as trimethylolpropane, glycerine, pentaerythritol, sorbitol, 1,2,3-trihydroxycyclohexane, or 1,3,5-trihydroxycyclohexane.

When the carbon number of the hydrocarbon group exceeds 10, the compatibility with the refrigerant decreases and a phase separation may occur in some cases. The carbon number is preferably 2 to 6.

In addition, as the oxygen-containing hydrocarbon group having 2 to 10 carbon atoms represented by each of $R^1$ and $R^3$, there can be exemplified a chained aliphatic group and a cyclic aliphatic group each having an ether bond, and a tetrahydrofurfuryl group is particularly preferred.

In the present invention, at least one of the above $R^1$ and $R^3$ represents preferably an alkyl group, more preferably an alkyl group having 1 to 3 carbon atoms, and particularly preferably a methyl group from the viewpoint of the viscosity property. Still further, from the same reason as above, both $R^1$ and $R^3$ each represent preferably an alkyl group and particularly preferably a methyl group.

$R^2$ in the general formula (I) represents an alkylene group having 2 to 4 carbon atoms, and as an oxyalkylene group as a repeating unit, there are exemplified oxyethylene group, oxypropylene group, and oxybutylene group. The oxyalkylene groups in one molecule may be identical to each other, or two or more kinds of oxyalkylene groups may be contained in one molecule.

"n" in the general formula (I) represents an integer of 1 to 6, and is determined depending on the number of the binding sites of $R^1$. For example, in the case where $R^1$ represents an alkyl group or an acyl group, "n" represents 1, and in the case where $R^1$ represents an aliphatic hydrocarbon group having 2, 3, 4, 5, or 6 binding sites, "n" represents 2, 3, 4, 5, or 6, respectively. Further, represents a number with which an average value of "m×n" becomes 6 to 80, and when the average value exceeds 80, compatibility decreases and oil returnability may be deteriorated, and hence, the object of the present invention may not be sufficiently achieved in some cases.

Of the compounds represented by the general formula (I), examples of those polyoxyalkylene glycol derivatives preferably include polypropylene glycol dimethyl ether, polyethylene-polypropylene glycol copolymer dimethyl ether, polyethylene-polypropylene glycol copolymer methyl butyl ether, and polypropylene glycol diacetate.

In the refrigerator oil composition of the present invention, a substance mainly containing, as a base oil, at least one kind selected from the polyoxyalkylene glycol derivatives described above. Herein, the phrase "mainly containing" refers to containing the polyoxyalkylene glycol derivative at a rate of 50% by mass or more. The content of the polyoxyalkylene glycol derivative in the base oil is preferably 70% by mass or more, more preferably 90% by mass or more, and still more preferably 100% by mass.

The base oil of the present invention is particularly preferred as an unsaturated fluorohydrocarbon refrigerant, but the refrigerant is poor in stability because the refrigerant has an olefin structure, and hence, the base oil needs to have a hydroxyl number of 5 mgKOH/g or less. The hydroxyl number is preferably 3 mgKOH/g or less and particularly preferably 1 mgKOH/g or less.

Further, it is preferred that the base oil have an ASTM color of 1 or less and an ash content of 0.1% by mass or less. The base oil having those properties has good stability, and hence is favorable.

The polyoxyalkylene glycol derivative can be obtained by, for example: polymerizing an alkylene oxide having 2 to 4 carbon atoms such as an ethylene oxide or a propylene oxide by using water or alkali hydroxide as an initiator to thereby obtain polyoxyalkylene glycol having hydroxyl groups at both terminals; and then subjecting both hydroxyl group terminals to etherification or esterification by using an alkyl halide or an acyl halide.

Further, the polyoxyalkylene glycol derivative can be also produced by: polymerizing an alkylene oxide having 2 to 4 carbon atoms by using a monovalent alcohol having 1 to 10 carbon atoms or an alkali metal salt thereof as an initiator to thereby obtain polyoxyalkylene glycol monoalkyl ether having an ether bond at one terminal and a hydroxyl group at the other terminal; and then subjecting the hydroxyl group to etherification or esterification. It should be noted that, in the case where a compound in which "m" represents 2 or more in the general formula (I) is produced, a polyvalent alcohol having a valency of 2 to 6 may be used instead of a monovalent alcohol as an initiator.

In producing the polyoxyalkylene glycol derivative by those methods, regarding the ratio of the polyoxyalkylene glycol or the like to the alkyl halide or the acyl halide in the etherification or esterification reaction, a hydroxyl group remains and a hydroxyl number increases in the case where the amount of the alkyl halide or the acyl halide is less than stoichiometric quantities. Therefore, the molar ratio of the polyoxyalkylene glycol or the like to the alkyl halide or the acyl halide is desirably set to be optimum. Further, by performing the polymerization, etherification, and esterification reactions under an inert gas atmosphere, coloring can be suppressed.

In the present invention, the kinematic viscosity of the base oil at 100° C. is preferably 2 to 50 mm$^2$/s, more preferably 3 to 40 mm$^2$/s, still more preferably 4 to 30 mm$^2$/s, and most preferably 6 to 20 mm$^2$/s. When the kinematic viscosity is 2 mm$^2$/s or more, favorable lubricity (load capacity resistance) is exhibited and sealing property is good, and when the kinematic viscosity is 50 mm$^2$/s or less, energy saving is also favorable.

Further, the molecular weight of the base oil is preferably 500 or more, more preferably 500 to 3,000, and still more preferably 600 to 2,500. The flash-point of the base oil is preferably 150° C. or higher. When the molecular weight of the base oil is 500 or more, desired properties as the refrigerator oil can be exhibited and the flash-point of the base oil can be also set to 150° C. or higher.

In the present invention, when the base oil has the above properties, the refrigerator oil composition may include, in addition to the polyoxyalkylene glycol derivative, another base oil at 50% by mass or less, preferably 30% by mass or less, and more preferably 10% by mass or less, but the refrigerator oil composition free of another base oil is still more preferred.

As the base oil that can be used together with the polyoxyalkylene glycol derivative, there are exemplified polyvinyl ethers, a copolymer of poly(oxy)alkylene glycol or a monoether thereof and a polyvinyl ether, polyesters, polyol ester-based compounds, polycarbonates, a hydride of α-olefin oligomer, a mineral oil, an alicyclic hydrocarbon compound, and an alkylated aromatic hydrocarbon compound.

The refrigerator oil composition of the present invention may contain at least one kind of additive selected from an extreme pressure agent, an oiliness agent, an antioxidant, an acid scavenger, and an anti-foaming agent.

Examples of the extreme pressure agent include phosphorus-based extreme pressure agents such as a phosphate, an acid phosphate, a phosphite, an acid phosphite, and amine salts thereof.

Of those phosphorus-based extreme pressure agents, tricresyl phosphate, trithiophenyl phosphate, tri(nonylphenyl) phosphite, dioleyl hydrogen phosphite, 2-ethylhexyldiphenyl phosphite, or the like is particularly preferred in terms of an extreme pressure property, frictional characteristic, and the like.

In addition, examples of the extreme pressure agent include metal salts of carboxylic acids. The term "metal salts of carboxylic acids" as used herein preferably refers to metal salts of carboxylic acids each having 3 to 60 carbon atoms, and, further, metal salts of aliphatic acids each having 3 to 30 carbon atoms, and particularly preferably 12 to 30 carbon atoms. Examples thereof further include metal salts of: dimer acids and trimer acids of the aliphatic acids; and dicarboxylic acids each having 3 to 30 carbon atoms. Of those, metal salts of aliphatic acids each having 12 to 30 carbon atoms or of dicarboxylic acids having 3 to 30 carbon atoms are particularly preferred.

On the other hand, a metal of which any such metal salt is constituted is preferably an alkali metal or an alkaline earth metal, and, in particular, is most suitably an alkali metal.

Further, examples of the extreme pressure agents other than those mentioned above include sulfur-based extreme pressure agents such as sulfurized fat, sulfurized aliphatic acid, sulfurized ester, sulfurized olefin, dihydrocarvyl polysulphide, thiocarbamates, thioterpenes, and dialkyl thiodipropionates.

The blending amount of the above extreme pressure agent is in the range of generally 0.001 to 5% by mass, or particularly preferably 0.005 to 3% by mass based on the total amount of the composition in terms of lubricity and stability. One kind of extreme pressure agent may be used alone, or two or more kinds thereof may be used in combination.

Examples of the oiliness agents include: aliphatic saturated and unsaturated monocarboxylic acids such as stearic acid and oleic acid; polymerized aliphatic acids such as dimer acids and hydrogenated dimer acids; hydroxy aliphatic acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearylamine and oleylamine; aliphatic saturated and unsaturated monocarboxylic acid amides such as lauric acid amide and oleic acid amide; and partial esters of a polyhydric alcohol such as glycerin and sorbitol, and an aliphatic saturated or unsaturated monocarboxylic acid.

One kind of oiliness agent may be used alone, or two or more kinds thereof may be used in combination. In addition, the blending amount of the oiliness agent is selected from the range of generally 0.01 to 10% by mass, or preferably 0.1 to 5% by mass based on the total amount of the composition.

A phenol-based antioxidant such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-di-phenyl-p-phenylenediamine is preferably blended as the antioxidant. The antioxidant is blended in the composition at a content of generally 0.01 to 5% by mass, or preferably 0.05 to 3% by mass in terms of an effect, economical efficiency, and the like.

Examples of the acid scavenger include: phenyl glycidyl ether; alkyl glycidyl ether; alkylene glycol glycidyl ether; phenyl glycidyl ester; alkyl glycidyl ester; alkenyl glycidyl ester; cyclohexeneoxide; α-olefinoxide; and an epoxy compound such as epoxidized soybean oil. Of those, phenyl glycidyl ether, alkyl glycidyl ether, alkylene glycol glycidyl ether, glycidyl-2,2-dimethyloctanoate, glycidyl benzoate, glycidyl-tert-butyl benzoate, glycidyl acrylate, glycidyl methacrylate, cyclohexeneoxide, or α-olefinoxide is preferable in terms of compatibility with the refrigerant.

Each of an alkyl group of the alkyl glycidyl ether and an alkylene group of the alkylene glycol glycidyl ether may be branched, and has typically 3 to 30, preferably 4 to 24, or particularly preferably 6 to 16 carbon atoms. In addition, one having a total of generally 4 to 50, preferably 4 to 24, or particularly preferably 6 to 16 carbon atoms is used as the α-olefinoxide. In the present invention, one kind of acid scavenger may be used, or two or more kinds thereof may be used in combination. In addition, the blending amount of the acid scavenger is in the range of generally 0.005 to 5% by mass, or particularly preferably 0.05 to 3% by mass with respect to the composition in terms of an effect and the suppression of the generation of sludge.

In the present invention, the stability of the refrigerator oil composition can be improved by blending the acid scavenger. The combined use of the extreme pressure agent and the antioxidant with the acid scavenger exerts an additional improving effect on the stability.

As the antifoaming agent, for example, a silicone oil, a fluorinated silicone oil, and the like are exemplified.

To the refrigerator oil composition of the present invention, other known various additives, for example, a copper deactivator such as N—[N,N'-dialkyl (an alkyl group having 3 to 12 carbon atoms) aminomethyl]triazole may be appropriately added in an amount which does not inhibit the object of the present invention.

The refrigerator oil composition of the present invention is applied to a refrigerator employing a refrigerant including at least one kind of fluorine-containing organic compound selected from the compounds represented by the molecular formula (A) or a combination of the fluorine-containing organic compound and a saturated fluorinated hydrocarbon compound. In particular, the refrigerator oil composition is applicable to a refrigerator employing a refrigerant including an unsaturated fluorinated hydrocarbon compound.

The used amounts of any one of the various refrigerants and the refrigerator oil composition in a method of lubricating a refrigerator using the refrigerator oil composition of the present invention are such that a mass ratio of the refrigerant to the refrigerator oil composition is in the range of preferably 99/1 to 10/90, or more preferably 95/5 to 30/70. The amount of the refrigerant below the above ranges is not preferred because a reduction in refrigerating capacity of the refrigerator is observed. In addition, the amount of the refrigerant beyond the above ranges is not preferred because the lubricity of the composition reduces. The refrigerator oil composition of the present invention, which can be used in any one of various refrigerators, is particularly preferably applicable to the compression refrigerating cycle of a compression refrigerator.

The refrigerator to which the refrigerator oil composition of the present invention is applied has a refrigerating cycle having a constitution which essentially needs a compressor, a condenser, an expansion mechanism (such as an expansion valve), and an evaporator, or a compressor, a condenser, an expansion mechanism, a drier, and an evaporator, uses the above-mentioned refrigerator oil composition of the present invention as a refrigerator oil, and uses the above-mentioned various refrigerants as refrigerants.

Herein, the drier is preferably filled with a desiccant formed of zeolite having a pore diameter of 0.33 nm or less. In addition, as the zeolite, a natural zeolite or a synthetic zeolite may be exemplified. Further, zeolite having a $CO_2$ gas absorbing amount of 1% or less at 25° C. and a $CO_2$ gas partial pressure of 33 kPa is more suitable. As the synthetic zeolite described above, XH-9 (a trade name), XH-600 (a trade name) manufactured by UNION SHOWA K.K., and the like are exemplified.

In the present invention, if the desiccant is used, moisture can be removed efficiently without absorbing of the refrigerant in the refrigerating cycle, and simultaneously, powderization of the desiccant due to deterioration of the desiccant itself is suppressed. Therefore, there is no possibility of clogging of pipes caused by the powderization or abnormal abrasion caused by entering of the powder into a friction part of the compressor, and as a result, the refrigerator can be driven stably for a long time period.

Various friction parts (such as a bearing) are present in a compressor in a refrigerator to which the refrigerator oil composition of the present invention is applied.

In the present invention, a part formed of an engineering plastic, or a part having an organic or inorganic coating film is used as each of the friction parts in terms of, in particular, a sealing property.

Preferable examples of the engineering plastic include a polyamide resin, a polyphenylene sulfide resin, and a polyacetal resin in terms of a sealing property, friction property, abrasion resistance, and the like.

In addition, examples of the organic coating film include a fluorine-containing resin coating film (such as a polytetrafluoroethylene coating film), a polyimide coating film, and a polyamideimide coating film in terms of a sealing property, friction property, abrasion resistance, and the like. Further, examples thereof include a thermosetting insulating film formed by using a resin substrate formed of a polyhydroxyether resin and a polysulfone-based resin and a resin coating material containing a crosslinking agent.

On the other hand, examples of the inorganic coating film include a graphite film, a diamond-like carbon film, a nickel film, a molybdenum film, a tin film, and a chromium film in terms of a sealing property, friction property, abrasion resistance, and the like. The inorganic coating film may be formed by a plating treatment, or may be formed by a physical vapor deposition method (PVD).

It should be noted that a part composed of, for example, a conventional alloy system such as an Fe base alloy, an Al base alloy, or a Cu base alloy can also be used as each of the friction parts.

The refrigerator oil composition of the present invention can be used in each of an air conditioner for cars, an electric air conditioner, a gas heat pump, an air conditioner, a cold storage, various hot water supply systems such as a vending machine or a showcase, and a refrigerating and heating system.

In the present invention, the water content in the system is preferably 300 ppm by mass or less and more preferably 200 ppm by mass or less. In addition, the residual air partial pressure in the system is preferably 10 kPa or less and more preferably 5 kPa or less.

The refrigerator oil composition of the present invention mainly contains a specific oxygen-containing compound as a base oil, has so low viscosity that energy saving can be improved, and has an excellent sealing property.

The compressor (a compressor for a refrigerator) of the present invention is a compressor using the above-mentioned refrigerator oil composition. That is, the compressor uses at least one kind of fluorine-containing organic compound selected from the compounds represented by the molecular formula (A) or a combination of the fluorine-containing organic compound and a saturated fluorohydrocarbon compound as a refrigerant, and uses the refrigerator oil composition.

Preferably used for a friction part of the compressor is a friction part in which a part or an entire part is formed of an engineering plastic or a friction part in which a part or an entire part has an organic coating film or an inorganic coating film. Examples of the friction part in the case of a swash plate compressor include a friction interface of swash plate and shoe, a friction interface of shoe and piston, and a friction interface of piston and cylinder block.

When at least one part of those friction parts is formed of the engineering plastic or has the organic coating film or the inorganic coating film, the sealing property of each of the compressor and the refrigerator including the compressor improves, and in addition, friction property and abrasion resistance thereof can be enhanced.

Preferred examples of the engineering plastic, the organic coating film, and the inorganic coating film are as mentioned above.

EXAMPLES

Subsequently, the present invention is described in more detail by way of Examples. However, the present invention is by no means limited by the Examples.

It should be noted that properties of the base oil and various characteristics of the refrigerator oil composition were determined according to the following procedure.

<Properties of Base Oil>
(1) Kinematic Viscosity at 100° C.

The kinematic viscosity at 100° C. was measured according to JIS K2283-1983 by using a glass-made capillary viscometer.

(2) Hydroxyl Number

The hydroxyl number was measured according to JIS K0070.

(3) Molecular Weight

The molecular weight was calculated according to the chemical structures of compounds constituting the base oil.

(4) Flash-Point

The flash-point was measured according to JIS K2265 (COC method).

<Various Characteristics of Refrigerator Oil Composition>
(5) Two-Phase Separation Temperature A measuring tube for two-phase separation temperature (internal volume: 10 mL) was filled with an oil (0.6 g) and a refrigerant (2.4 g) and kept in a thermostatic chamber. The temperature in the thermostatic chamber was increased from room temperature (25° C.) at a rate of 1° C./min, and a two-phase separation temperature was measured.

It should be noted that, as a refrigerant, 1,2,3,3,3-pentafluoropropene ("PC07052" manufactured by Apollo Scientific Ltd.) and 2,3,3,3-tetrafluoropropene were used.

(6) Stability (Sealed Tube Test)

A glass tube was filled with an oil (4 mL) and a refrigerant (1 g) (water content of 200 ppm), and metal catalysts of iron, copper, and aluminum, and sealed. After the glass tube was kept at an air pressure of 26.6 kPa at a temperature of 175° C. for 10 days, oil appearance, catalyst appearance, and the presence or absence of sludge were visually observed and the acid value was measured. The same refrigerant used in the item (5) was used.

The kinds of components used in preparation of the refrigerator oil composition are described below.

As the base oil, A1 to A21 were used. Table 1 shows the compound name and properties of each base oil.

TABLE 1

| Kind of base oil | Chemical name | Hydroxyl number (mgKOH/g) | Kinematic viscosity at 100° C. (mm²/s) | Molecular weight | Flash-point (° C.) |
|---|---|---|---|---|---|
| A1 | Me-PO-Me | 0.1 | 10.2 | 1,200 | 210 |
| A2 | | 0.4 | 10.3 | 1,200 | 210 |
| A3 | | 0.6 | 20.5 | 1,700 | 234 |
| A4 | | 1.0 | 9.8 | 1,200 | 209 |
| A5 | | 2.3 | 10.1 | 1,200 | 204 |
| A6 | | 4.0 | 7.6 | 780 | 182 |
| A7 | | 7.9 | 10.5 | 1,170 | 203 |
| A8 | | 30.0 | 10.4 | 1,130 | 198 |
| A9 | Bu-PO-Me | 0.4 | 12.3 | 1,250 | 223 |
| A10 | | 1.0 | 7.8 | 800 | 185 |
| A11 | Me-PO/EO-Me | 0.1 | 9.8 | 1,200 | 212 |
| A12 | (Molar ratio of | 0.3 | 25.3 | 2,000 | 235 |
| A13 | PO/EO = 8/2) | 1.0 | 10.1 | 1,200 | 209 |
| A14 | | 3.2 | 10.1 | 1,200 | 205 |
| A15 | | 4.2 | 15.8 | 1,530 | 221 |
| A16 | | 8.5 | 21.6 | 1,750 | 237 |
| A17 | | 34.0 | 15.9 | 1,540 | 224 |
| A18 | Me-PO-OH | 56.0 | 10.6 | 1,100 | 196 |
| A19 | HO-PO-OH | 102.0 | 10.5 | 990 | 192 |
| A20 | Bu-PO/EO-OH (Molar ratio of PO/EO = 5/5) | 25.0 | 21.7 | 1,700 | 225 |
| A21 | THFF-PO-Me | 0.4 | 11.4 | 1,230 | 204 |

[Notes]
Me-PO-Me: polyoxypropylene glycol dimethyl ether
Bu-PO-Me: polyoxypropylene glycol methylbutyl ether
Me-PO/EO-Me: polyoxypropylene polyoxyethylene glycol copolymer dimethyl ether
Me-PO-OH: polyoxypropylene glycol monomethyl ether
HO-PO-OH: polyoxypropylene glycol
Bu-PO/EO-OH: polyoxypropylene glycol polyoxyethylene glycol copolymer monobutyl ether
THFF-PO-Me: polypropylene glycol tetrahydrofurfuryl ether methyl ether In addition, an antioxidant B1 (2,6-di-t-butyl-4-methylphenol) was used as an additive.

Examples 1 to 23, Comparative Examples 1 to 14, and Reference Examples 1 to 9

Refrigerator oil compositions each having a composition as shown in Tables 2 were prepared, and the properties thereof were evaluated by using, as refrigerants, 1,2,3,3,3-pentafluoropropene (Examples 1 to 13 and Comparative Examples 1 to 7) and 2,3,3,3-tetrafluoropropene (Examples 14 to 23 and Comparative Examples 8 to 14). The results thereof are shown in Tables 2. It is to be noted that, in reference examples, 1,1,1,2-tetrafluoroethane was used as a refrigerant.

TABLE 2

| | | | Example | | | | | |
|---|---|---|---|---|---|---|---|---|
| | | | 1 | 2 | 3 | 4 | 5 | 6 |
| Blending composition | Base oil | Kind | A1 | A2 | A3 | A4 | A5 | A6 |
| | | (% by mass) | 99.5 | 99.5 | 99.5 | 99.5 | 99.5 | 99.5 |
| | Additive | Antioxidant | B1 | B1 | B1 | B1 | B1 | B1 |
| | | (% by mass) | 0.5 | 0.5 | 0.5 | 0.5 | 0.5 | 0.5 |
| Performance evaluation | Two-phase separation temperature (° C.) (oil content of 20%) | | 40< | 40< | 40< | 40< | 40< | 40< |
| | Sealed tube test | Oil appearance | Good | Good | Good | Good | Good | Good |
| | | Catalyst appearance | Good | Good | Good | Good | Good | Good |
| | | Presence or absence of sludge | Absent | Absent | Absent | Absent | Absent | Absent |
| | | Acid value (mgKOH/g) | 0.01> | 0.01> | 0.01> | 0.01> | 0.01> | 0.03 |

| | | | Example | | | | | | |
|---|---|---|---|---|---|---|---|---|---|
| | | | 7 | 8 | 9 | 10 | 11 | 12 | 13 |
| Blending composition | Base oil | Kind | A9 | A10 | A11 | A12 | A13 | A14 | A15 |
| | | (% by mass) | 99.5 | 99.5 | 99.5 | 99.5 | 99.5 | 99.5 | 99.5 |
| | Additive | Antioxidant | B1 | B1 | B1 | B1 | B1 | B1 | B1 |
| | | (% by mass) | 0.5 | 0.5 | 0.5 | 0.5 | 0.5 | 0.5 | 0.5 |
| Performance | Two-phase separation temperature (° C.) (oil content of 20%) | | 40< | 40< | 40< | 40< | 40< | 40< | 40< |
| | Sealed test | Oil appearance | Good | Good | Good | Good | Good | Good | Good |
| | | Catalyst appearance | Good | Good | Good | Good | Good | Good | Good |
| | | Presence or absence of sludge | Absent | Absent | Absent | Absent | Absent | Absent | Absent |
| | | Acid value (mgKOH/g) | 0.01> | 0.01> | 0.01> | 0.01> | 0.01> | 0.01> | 0.03 |

| | | | Example | | | | | |
|---|---|---|---|---|---|---|---|---|
| | | | 14 | 15 | 16 | 17 | 18 | 19 |
| Composition | Base oil | Kind | A1 | A2 | A4 | A5 | A6 | A10 |
| | | (% by mass) | 93.3 | 93.3 | 93.3 | 93.3 | 93.3 | 93.3 |
| | Additive | Antioxidant | B1 | B1 | B1 | B1 | B1 | B1 |
| | | (% by mass) | 0.5 | 0.5 | 0.5 | 0.5 | 0.5 | 0.5 |
| | | Acid scavenger | B2 | B2 | B2 | B2 | B2 | 32 |
| | | (% by mass) | 5 | 5 | 5 | 5 | 5 | 5 |

TABLE 2-continued

|  |  |  |  |  |  |  |  |  |
|---|---|---|---|---|---|---|---|---|
|  |  | Extreme pressure agent (% by mass) | B3 1.2 | B3 1.2 | B3 1.2 | B3 1.2 | B3 1.2 | B3 1.2 |
| Performance |  | Two-phase separation temperature (° C.) (oil content of 20%) | 18 | 16 | 26 | 20 | 39 | 32 |
|  | Sealed tube test | Oil appearance | Good | Good | Good | Good | Good | Good |
|  |  | Catalyst appearance | Good | Good | Good | Good | Good | Good |
|  |  | Presence or absence of sludge | Absent | Absent | Absent | Absent | Absent | Absent |
|  |  | Acid value (mgKOH/g) | 0.01> | 0.01> | 0.01> | 0.01> | 0.02 | 0.01> |

|  |  |  | Example |  |  |  |
|---|---|---|---|---|---|---|
|  |  |  | 20 | 21 | 22 | 23 |
| Composition | Base oil | Kind | A11 | A13 | A14 | A21 |
|  |  | (% by mass) | 93.3 | 93.3 | 93.3 | 93.3 |
|  | Additive | Antioxidant | B1 | B1 | B1 | B1 |
|  |  | (% by mass) | 0.5 | 0.5 | 0.5 | 0.5 |
|  |  | Acid scavenger | B2 | B2 | B2 | B2 |
|  |  | (% by mass) | 5 | 5 | 5 | 5 |
|  |  | Extreme pressure agent | B3 | B3 | B3 | B3 |
|  |  | (% by mass) | 1.2 | 1.2 | 1.2 | 1.2 |
| Performance |  | Two-phase separation temperature (° C.) (oil content of 20%) | 23 | 19 | 18 | 12 |
|  | Sealed tube test | Oil appearance | Good | Good | Good | Good |
|  |  | Catalyst appearance | Good | Good | Good | Good |
|  |  | Presence or absence of sludge | Absent | Absent | Absent | Absent |
|  |  | Acid value (mgKOH/g) | 0.01> | 0.01> | 0.01> | 0.01> |

|  |  |  | Comparative example |  |  |  |  |  |  |
|---|---|---|---|---|---|---|---|---|---|
|  |  |  | 1 | 2 | 3 | 4 | 5 | 6 | 7 |
| Blending composition | Base oil | Kind | A7 | A8 | A16 | A17 | A18 | A19 | A20 |
|  |  | (% by mass) | 99.5 | 99.5 | 99.5 | 99.5 | 99.5 | 99.5 | 99.5 |
|  | Additive | Antioxidant | B1 | B1 | B1 | B1 | B1 | B1 | B1 |
|  |  | (% by mass) | 0.5 | 0.5 | 0.5 | 0.5 | 0.5 | 0.5 | 0.5 |
| Performance |  | Two-phase separation temperature (° C.) (oil content of 20%) | 40< | 40< | 40< | 40< | 40< | 40< | 40< |
|  | Sealed tube test | Oil appearance | Yellow | Yellow | Yellow | Yellow | Yellow | Yellow | Yellow |
|  |  | Catalyst appearance | Slight color change by Cu | Slight color change by Cu | Slight color change by Cu | Slight color change by Cu | Slight color change by Cu | Slight color change by Cu | Slight color change by Cu |
|  |  | Presence or absence of sludge | Slight | Slight | Slight | Slight | Slight | Slight | Slight |
|  |  | Acid value (mgKOH/g) | 0.62 | 2.8 | 0.75 | 3.6 | 4.8 | 7.7 | 4.3 |

|  |  |  | Comparative example |  |  |  |  |  |  |
|---|---|---|---|---|---|---|---|---|---|
|  |  |  | 8 | 9 | 10 | 11 | 12 | 13 | 14 |
| Composition | Base oil | Kind | A7 | A8 | A16 | A17 | A18 | A19 | A20 |
|  |  | (% by mass) | 93.3 | 93.3 | 93.3 | 93.3 | 93.3 | 93.3 | 93.3 |
|  | Additive | Antioxidant | B1 | B1 | B1 | B1 | B1 | B1 | B1 |
|  |  | (% by mass) | 0.5 | 0.5 | 0.5 | 0.5 | 0.5 | 0.5 | 0.5 |
|  |  | Acid scavenger | B2 | B2 | B2 | B2 | B2 | B2 | B2 |
|  |  | (% by mass) | 5 | 5 | 5 | 5 | 5 | 5 | 5 |
|  |  | Extreme pressure agent | B3 | B3 | B3 | B3 | B3 | B3 | B3 |
|  |  | (% by mass) | 1.2 | 1.2 | 1.2 | 1.2 | 1.2 | 1.2 | 1.2 |
| Performance evaluation |  | Two-phase separation temperature (° C.) (oil content of 20%) | 14 | 15 | −23 | 2 | 11 | 12 | −25 |
|  | Sealed tube test | Oil appearance | Yellow | Yellow | Yellow | Yellow | Yellow | Yellow | Yellow |
|  |  | Catalyst appearance | Slight color change by Cu | Slight color change by Cu | Slight color change by Cu | Slight color change by Cu | Slight color change by Cu | Slight color change by Cu | Slight color change by Cu |
|  |  | Presence or absence of sludge | Slight | Slight | Slight | Slight | Slight | Slight | Slight |
|  |  | Acid value (mgKOH/g) | 0.45 | 1.6 | 0.53 | 2.4 | 3.4 | 4.9 | 3.1 |

|  |  |  | Reference Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Blending composition | Base oil | Kind | A1 | A6 | A8 | A9 | A11 | A17 | A18 | A19 | A20 |
|  |  | (% by mass) | 99.5 | 99.5 | 99.5 | 99.5 | 99.5 | 99.5 | 99.5 | 99.5 | 99.5 |
|  | Additive | Antioxidant | B1 | B1 | B1 | B1 | B1 | B1 | B1 | B1 | B1 |
|  |  | (% by mass) | 0.5 | 0.5 | 0.5 | 0.5 | 0.5 | 0.5 | 0.5 | 0.5 | 0.5 |
| Performance evaluation |  | Two-phase separation temperature (° C.) (oil content of 20%) | 40< | 40< | 40< | 40< | 40< | 40< | 40< | 40< | 40< |
|  | Sealed | Oil appearance | Good | Good | Good | Good | Good | Good | Good | Good | Good |

TABLE 2-continued

| tube test | | | | | | | | | | |
|---|---|---|---|---|---|---|---|---|---|---|
| | Catalyst appearance | Good | Good | Good | Good | Good | Good | Good | Good | Good |
| | Presence or absence of sludge | Absent | Absent | Absent | Absent | Absent | Absent | Absent | Absent | Absent |
| | Acid value (mgKOH/g) | 0.01> | 0.01> | 0.01> | 0.01> | 0.01> | 0.01> | 0.01> | 0.01> | 0.01> |

As is clear from Tables 2, the refrigerator oil compositions (Examples 1 to 13) of the present invention each have a two-phase separation temperature of higher than 40° C. with respect to 1,2,3,3,3-pentafluoropropene as a refrigerant, and each have excellent stability in the sealed tube test using 1,2,3,3,3-pentafluoropropene.

Further, Examples 14 to 23 each have a two-phase separation temperature of higher than 10° C. and lower than 40° C. with respect to 2,3,3,3-tetrafluoropropene as a refrigerant, but each have excellent stability in the sealed tube test using 2,3,3,3-tetrafluoropropene.

In contrast, the refrigerator oil compositions (Comparative Examples 1 to 14) in which A7, A8, and A16 to A20 are used as base oils each have remarkably poor stability.

It should be noted that in the case where 1,1,1,2-tetrafluoroethane is used as a refrigerant, the refrigerator oil compositions (Reference Examples 1, 2, 4, and 5) of the present invention and the refrigerator oil compositions (Reference Examples 3 and 6 to 9) used in comparative examples each have good stability.

INDUSTRIAL APPLICABILITY

The lubricant composition for a refrigerator of the present invention can provide a lubricant composition for a refrigerator having the following characteristics and a compressor using the lubricant composition for a refrigerator: the composition being used for a refrigerator using a refrigerant having a specific structure such as an unsaturated fluorinated hydrocarbon compound serving as a refrigerant having a low global warming potential and usable particularly in current air-conditioning systems for cars or the like; and the composition having excellent stability as well as excellent compatibility with the refrigerant.

The invention claimed is:

1. A composition comprising a refrigerant and a lubricant composition,
   wherein
   the refrigerant comprises at least one kind of unsaturated fluorinated hydrocarbon compound selected from the group consisting of compounds represented by the following molecular formula (A) or comprises a combination of the at least one unsaturated fluorinated hydrocarbon compound and a saturated fluorinated hydrocarbon compound, $$C_pO_qF_rR_s \quad (A),$$

wherein
   R represents H; "p" represents an integer of 2 to 6, "q" represents 0, "r" represents an integer of 1 to 12, and "s" represents an integer of 0 to 11; and one or more carbon-carbon unsaturated bonds are included in a molecule, and the lubricant composition comprises a base oil comprising, as a main component, a polyoxyalkylene glycol derivative represented by the following formula (I) and having a hydroxyl number of 5 mgKOH/g or less,

$$R^1-[(OR^2)_m-OR^3]_n \quad (I)$$

wherein
   $R^1$ represents a hydrogen atom, a hydrocarbon group having 1 to 10 carbon atoms, an acyl group having 2 to 10 carbon atoms, a hydrocarbon group having 2 to 6 binding sites and 1 to 10 carbon atoms, or an oxygen-containing hydrocarbon group having 1 to 10 carbon atoms; $R^2$ represents an alkylene group having 2 to 4 carbon atoms; $R^3$ represents a hydrogen atom, a hydrocarbon group having 1 to 10 carbon atoms, an acyl group having 2 to 10 carbon atoms, or an oxygen-containing hydrocarbon group having 1 to 10 carbon atoms; "n" represents an integer of 1 to 6; and "m" represents a number with which an average value of "m×n" becomes 6 to 80, provided that at least one of $R^1$ and $R^3$ represents an alkyl group.

2. The composition according to claim 1, wherein the refrigerant is formed of an unsaturated fluorinated hydrocarbon refrigerant having 2 to 3 carbon atoms or a combination of a saturated fluorinated hydrocarbon refrigerant having 1 to 2 carbon atoms and an unsaturated fluorinated hydrocarbon refrigerant having 3 carbon atoms.

3. The composition according to claim 1, wherein the base oil has a kinematic viscosity of from 2 to 50 mm²/s at 100° C.

4. The composition according to claim 1, wherein the base oil has a molecular weight of 500 or more.

5. The composition according to claim 1, wherein the base oil has a hydroxyl number of 1 mgKOH/g or less.

6. The composition according to claim 1, comprising at least one additive selected from the group consisting of an extreme pressure agent, an oiliness agent, an antioxidant, an acid scavenger, and an anti-foaming agent.

7. The composition according to claim 1, wherein a friction part in the refrigerator is formed of an engineering plastic or includes an organic coating film or an inorganic coating film.

8. The composition according to claim 7, wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent.

9. The composition according to claim 7, wherein the inorganic coating film is a graphite film, a diamond-like carbon film, a tin film, a chromium film, a nickel film, or a molybdenum film.

10. The composition according to claim 1, which is used in various hot-water supplying systems or refrigeration and heating systems for car air conditioners, electric air conditioners for cars, gas heat pumps, air conditioners, refrigerators, vending machines, or showcases.

11. The composition according to claim 10, wherein a water content in a system is 300 ppm by mass or less and a residual air partial pressure in the system is 10 kPa or less.

12. A compressor using the composition according to claim 1.

13. The compressor according to claim 12, wherein a friction part is formed of an engineering plastic or includes an organic coating film or an inorganic coating film.

14. The compressor according to claim 13, wherein the engineering plastic is a polyamide resin, a polyphenylene sulfide resin, or a polyacetal resin.

15. The compressor according to claim 13, wherein the organic coating film is a polytetrafluoroethylene coating film, a polyimide coating film, a polyamideimide coating film, or a thermosetting insulating film formed from a resin coating material comprising a resin base material comprising a polyhydroxyether resin and a polysulfone-based resin, and a cross-linking agent.

16. The compressor according to claim 13, wherein the inorganic coating film is a graphite film, a diamond-like carbon film, a tin film, a chromium film, a nickel film, or a molybdenum film.

17. The composition according to claim 1, wherein the unsaturated fluorinated compound is a fluorinated compound of propene.

18. The composition according to claim 17, wherein the fluorinated compound of propene is 1,2,3,3,3-pentafluoropropene or 2,3,3,3-tetrafluoropropene.

19. The composition according to claim 1, wherein the saturated fluorinated hydrocarbon compound in claim 1 is difluoromethane, 1,1-difluoroethane or 1,1,1,2-tetrafluoroethane.

20. The composition according to claim 1, wherein at least one of $R^1$ and $R^3$ in the formula (I) represents an alkyl group having 1 to 6 carton atoms.

21. The composition according to claim 1, wherein at least one of $R^1$ and $R^3$ in the formula (I) represents a methyl group or a butyl group.

22. The composition according to claim 1, wherein $R^2$ in the formula (I) represents an alkylene group having 2 to 4 carbon atoms.

23. The composition according to claim 1, wherein the base oil has a hydroxyl number of 3 mgKOH/g or less.

* * * * *